(12) United States Patent
Chatterton et al.

(10) Patent No.: US 8,799,474 B2
(45) Date of Patent: Aug. 5, 2014

(54) APPARATUS AND METHOD TO ALLOCATE LIMITED RESOURCES

(75) Inventors: Deon J. Chatterton, Livermore, CA (US); Shmuel Shaffer, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 556 days.

(21) Appl. No.: 12/371,285

(22) Filed: Feb. 13, 2009

(65) Prior Publication Data

US 2010/0211680 A1  Aug. 19, 2010

(51) Int. Cl.
G06F 15/173 (2006.01)
G06F 9/50 (2006.01)

(52) U.S. Cl.
CPC .................................. *G06F 9/5011* (2013.01)
USPC .......................................... 709/226; 718/104

(58) Field of Classification Search
USPC .......................................... 709/226; 718/104
See application file for complete search history.

(56) References Cited

U.S. PATENT DOCUMENTS

| | | | |
|---|---|---|---|
| 5,522,026 A * | 5/1996 | Records et al. | 715/710 |
| 5,687,167 A * | 11/1997 | Bertin et al. | 370/254 |
| 6,115,748 A * | 9/2000 | Hauser et al. | 709/234 |
| 6,363,445 B1 * | 3/2002 | Jeddeloh | 710/113 |
| 6,590,856 B2 * | 7/2003 | Tsukagoshi et al. | 369/275.3 |
| 6,625,155 B1 * | 9/2003 | Dziong | 370/395.2 |
| 6,956,821 B2 * | 10/2005 | Szviatovszki et al. | 370/237 |
| 6,977,898 B1 * | 12/2005 | Miriyala | 370/236 |
| 7,116,682 B1 * | 10/2006 | Waclawsky et al. | 370/468 |
| 2002/0097031 A1 * | 7/2002 | Cook et al. | 323/273 |
| 2003/0026291 A1 * | 2/2003 | Engel | 370/468 |
| 2003/0236854 A1 * | 12/2003 | Rom et al. | 709/217 |
| 2004/0213197 A1 * | 10/2004 | Zimmerman et al. | 370/346 |
| 2005/0204085 A1 * | 9/2005 | Fukuyama et al. | 710/244 |

* cited by examiner

*Primary Examiner* — Frantz Jean
(74) *Attorney, Agent, or Firm* — Schwegman Lundberg & Woessner, P.A.

(57) ABSTRACT

A computerized method and apparatus to allocate a shared resource are described. The method may comprise accessing sensor data corresponding to an availability of the shared resource, and identifying when the availability of the shared resource reaches a threshold level below which the activities compete for the shared resource. Thereafter, when the activities compete for the shared resource, the method may allocate at least a portion of the shared resource to the activity associated with an active policy having a higher priority.

22 Claims, 10 Drawing Sheets

APPARATUS AND METHOD TO ALLOCATE LIMITED RESOURCES

FIELD

The present disclosure relates generally to allocation of resources consumed during activities executed in response to policies. The activities may relate to entities such as network devices in a computer network, operations performed by emergency response teams, or any other entities.

BRIEF DESCRIPTION OF DRAWINGS

Embodiments are illustrated by way of example, and not limitation, in the figures of the accompanying drawings, in which like references indicate similar elements and in which.

DESCRIPTION OF EXAMPLE EMBODIMENTS

It will be evident, however, to one skilled in the art that embodiments of the inventive subject matter may be practiced without these specific details. In general, well-known instruction instances, protocols, structures and techniques have not been shown in detail.

Overview

A computerized method and apparatus to allocate a limited shared resource are described. The method may comprise accessing sensor data corresponding to an availability of the shared resource, and identifying when the availability of the shared resource reaches a threshold level below which the activities compete for the shared resource. Thereafter, when the activities compete for the shared resource, the method may allocate at least a portion of the shared resource to the activity associated with an active policy having a higher priority.

Example Embodiments

Example embodiments may manage consumption of the limited shared resource. Implementing a policy (e.g., a power management policy, network management policy, or the like) may result in many different activities being performed. Two or more of these activities may consume a shared resource and thus circumstances may arise where the activities compete for the shared resource. For example, the activities may compete for a limited amount of electrical power available from a back-up power supply, a limited amount of network bandwidth, or the like.

Figure 1:
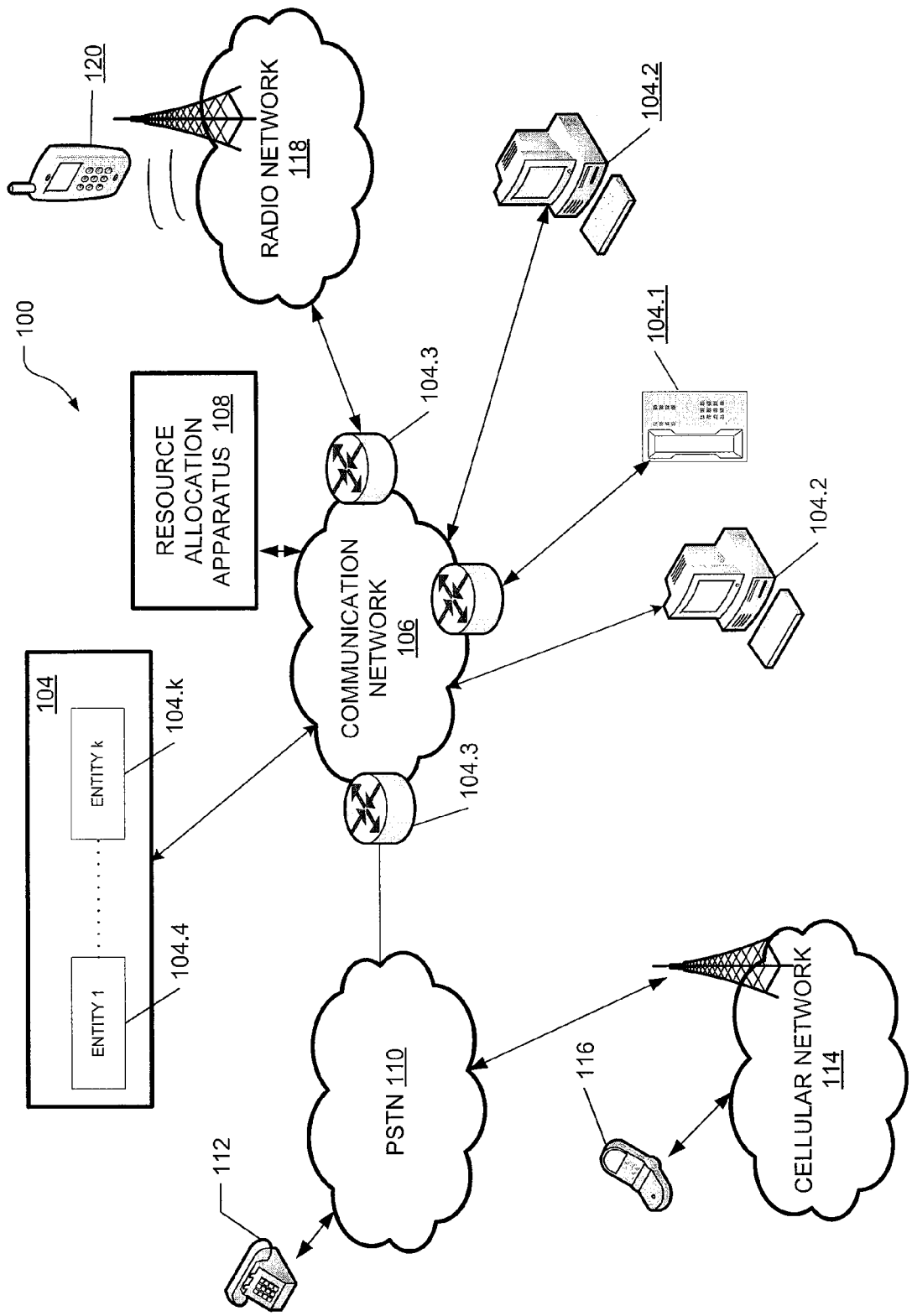
FIG. 1 depicts a simplified diagram of system, in accordance with an example embodiment, to allocate limited resources to entities via a network.

Referring to the drawings, FIG. 1 depicts a simplified diagram of a system 100, in accordance with an example embodiment. The system 100 is shown to include a plurality of entities 104 and a resource allocation apparatus 108 that controls allocation of resources to the entities 104. For example, the entities 104 are shown to include voice over IP (VoIP) telephones 104.1, computers 104.2, network elements 104.3 (e.g., switches and/or routers), and other entities 104.4-104.k. The entities 104 are networked to the resource allocation apparatus 108 via a communication network 106. In use, the resource allocation apparatus 108 is configured to monitor consumption of one or more limited resources consumed by the entities 104, and prioritize allocation of the shared resource when the availability of the limited resource falls below a reference threshold level (e.g., a back-up power supply is running low).

When the example embodiment is deployed in a building, the entities 104.3-104.k may include one or more access card readers, video cameras, access badge readers, temperature sensors, door locks, motion sensors, wireless network devices, IP line-cards, or any other networked device connectable to the communication network 106.

As the system 100 may be used to implement policies in emergency situations, it is also shown by way of example to include connectivity to a public switched telephone network (PSTN) 110 servicing telephones 112, a cellular network 114 servicing mobile phones 116, and a radio network 118 configured to communicate with one or more mobile communication devices (e.g., push-to-talk (PTT) radios 120).

Figure 2:
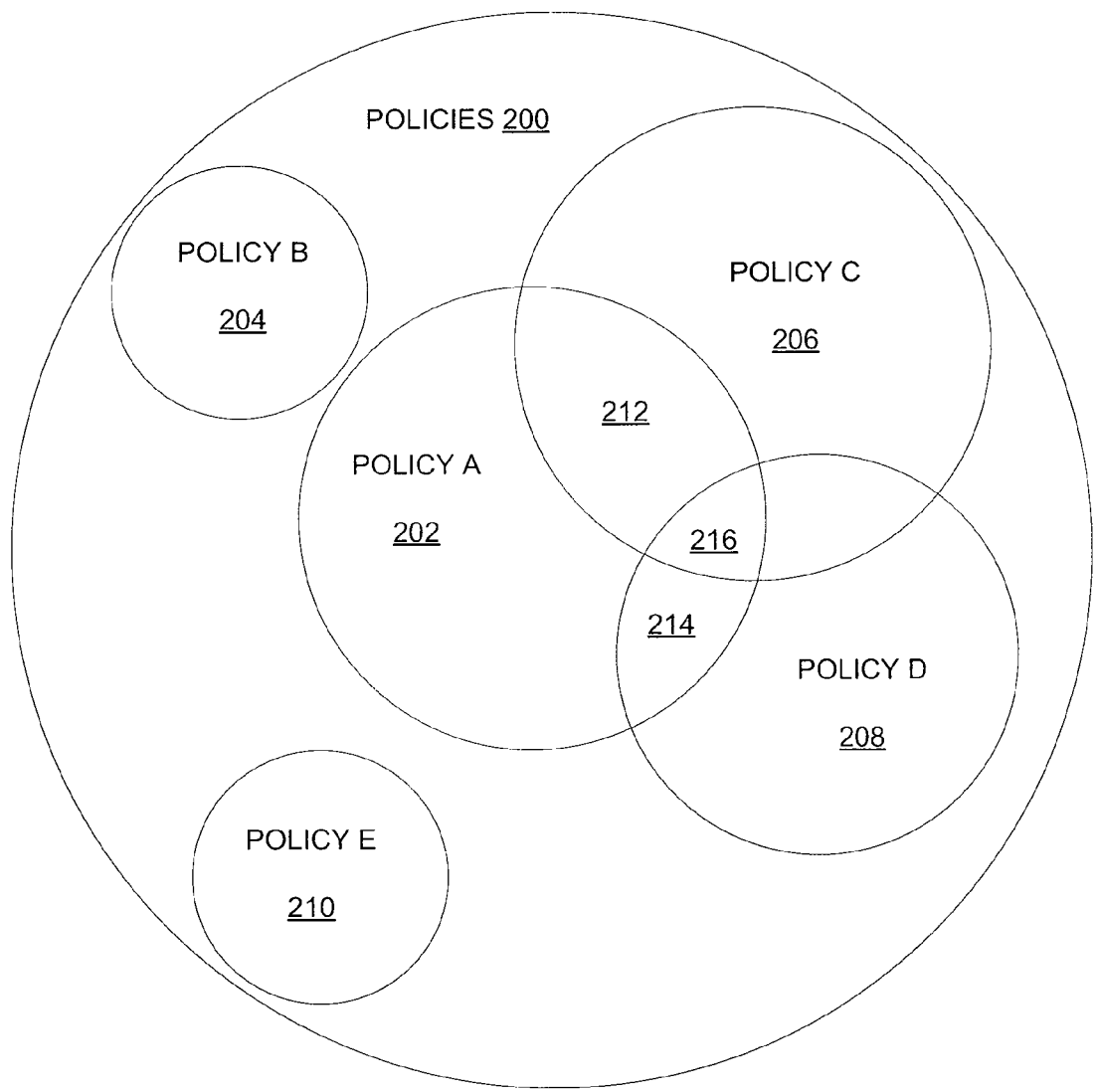
FIG. 2 depicts a simplified block diagram of a plurality of policies, each policy including activities that at least one consume shared resource.

FIG. 2 depicts a simplified block diagram of a plurality of policies 200 that consume at least one limited shared resource (e.g., electrical power, bandwidth, or any other resource). The resource allocation apparatus 108 may implement the policies 200 and, accordingly, the policies 200 shown in FIG. 2 are described by way of example with reference thereto.

The policies 200 are shown to include, by way of example, five different policies, namely, policy A 202, policy B 204, policy C 206, policy D 208, and policy E 210. As described in more detail below, each policy 204-210 may be associated with one or more activities, which are associated with entities that consume at least one limited shared resource. In the example policies 200, the policy B 204 does not include any activities or entities that overlap with any other policies. Likewise, the policy E 210 is associated with one or more activities or entities that do not overlap with any other policies. However, for example, the policy A 202 is shown to overlap with the policy C 206 and the policy D 208. For example, the policy A 202 may be associated with entities that consume a limited resource such as, for example, electrical power provided by a back-up battery system. The policy C 206 may relate to entities associated with network bandwidth and, accordingly, may consume the shared electrical power as shown by intersecting area 212. Further, for example, the policy D 208 may be associated with entities such as electrical door locks that should remain open during an emergency situation. These electrical door locks also consume power and, accordingly, the entities overlap with those associated with policy A 202. It will be noted that intersecting 216 identifies entities associated with policy A 202, policy C 206 and policy D 208.

When the policies 200 are active and, for example, there is a power failure, entities associated with policy A 202, policy C 206, and policy D 208 (entities identified in the intersecting areas 212, 214, and 216) compete for the limited shared resource. However, the policies 202, 206 and 208 may have different priorities and the availability of the limited shared resource may be allocated based on these priorities. For example, allocating power to door locks may have a higher priority than allocating power for network elements to provide bandwidth for routine communications. An example of bandwidth priority may include prioritizing the allocation of bandwidth to surveillance cameras in an emergency situation as opposed to provided bandwidth for routine network communications. In an example embodiment, the resource allocation apparatus 108 is configured to monitor the consumption of resources by various entities and, when the availability of the resources is limited, allocate resources to the various entities based on priority.

Figure 3:
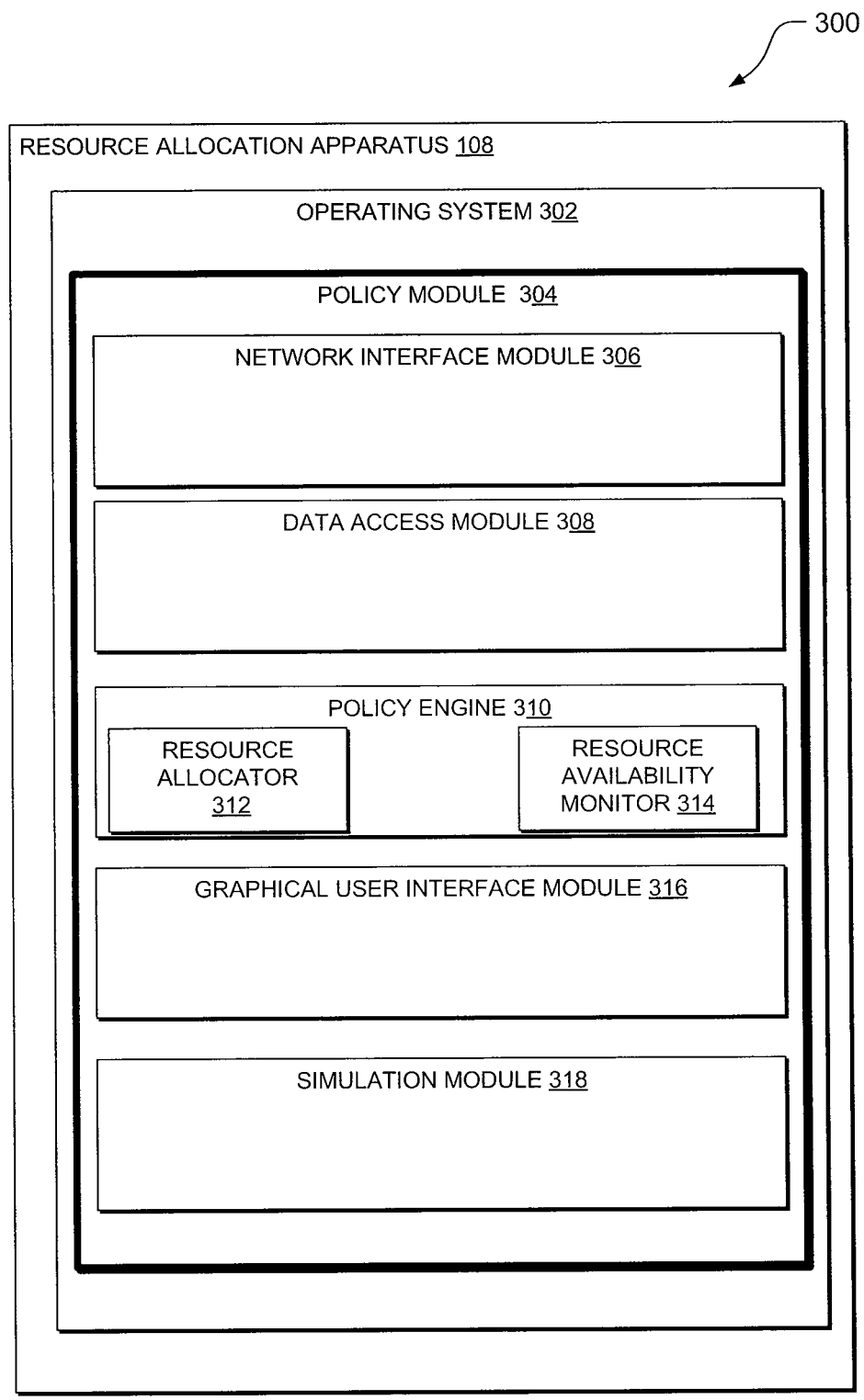
FIG. 3 depicts a simplified block diagram of an apparatus, in accordance with an example embodiment, to allocate a shared resources.

FIG. 3 depicts a simplified block diagram 300 of the resource allocation apparatus 108, in accordance with an example embodiment, shown in FIG. 1. The apparatus 108 includes memory for storing an operating system 302 that, when executed, performs the methodologies described herein. As described above with reference to the policies 200, the apparatus 108 includes a policy module 304 to implement policies having activities associated with one or more entities. The policy module 304 is configured to manage the allocation of a limited resource consumed by two or more entities. In an example embodiment, the policy module 304 dynamically controls the allocation of the limited resource. For example, the policy module 304 may allocate all of the resources to a single entity (e.g., allocate all available power to a data back-up operation); allocate the available resources to a limited number of entities (e.g., a data back-up operation and selected VoIP phones to allow emergency calls), or any other allocation. Thus, in an example embodiment, limited resources may be dynamically allocated or managed as the availability of the resource changes.

As shown in FIG. 3, the policy module 304 may include a network interface module 306, a data access module 308, a policy engine 310, a GUI module 316 and, optionally, a simulation module 318. The network interface module 306 is configured to interface the apparatus 108 to the communication network 106. In an example embodiment, resource consumption data used by the policy engine 310 to allocate resources when their availability reaches, for example, a critical level is stored in a database. Accordingly, the data access module 308 may be provided to access resource consumption data stored in a local or remote database.

The policy engine 310 may include a resource allocator 312 that controls the allocation of resources to the various entities when activities associated with various policies are performed. In an example embodiment, allocation (or reallocation) of a resource by the resource allocator 312 is triggered when the shared resource consumed by two or more entities becomes limited. Accordingly, the policy engine 310 may include a resource availability monitor 314 to monitor the availability of resources. For example, the resource availability monitor 314 may monitor the availability of electrical power remaining in a back-up battery. When the remaining power reaches a threshold level below which there is insufficient power to perform all activities (or complete selected activities), a trigger signal may be provided to the resource allocator 312 to reallocate power to one or more entities associated with high priority policies. In an example embodiment, reallocation of resources includes limiting the resource consumption of one or more devices. Thus, in an example embodiment, resources may not be totally denied to a device but reduced (e.g., resources supplied to a device may be reduced by 0-100%).

In an example embodiment, the simulation module 318 allows an administrator to simulate execution of policies to identify which entities used by active policies compete for a shared resource. The simulation module 318 may also generate resource consumption data that is stored in a database. As described in more detail below, the resource consumption data may include data estimating consumption of the resource as a function of time, data estimating a quantity of the resource required to complete a given activity, and so on. In accordance with one example embodiment the simulation module 318 calculates and evaluates multiple scenarios resulting from various policies and interacts accordingly with the policy engine 310. For example, a policy may have a backup operation as its top priority. In case of an emergency, the simulation module 318 may determine if the backup operation were to receive all of the power, despite the fact that all other operations would be stopped, the backup operation would not be able to complete successfully. Based on this simulation result, the policy engine 310 may decide to reallocate resources away from the top priority backup process and dedicate them to other operations having a lower priority. Accordingly, the policy engine 310 and the simulation module 318 may intelligently control the allocation of resources so that the remaining resources are used in an efficient manner.

Figure 4:
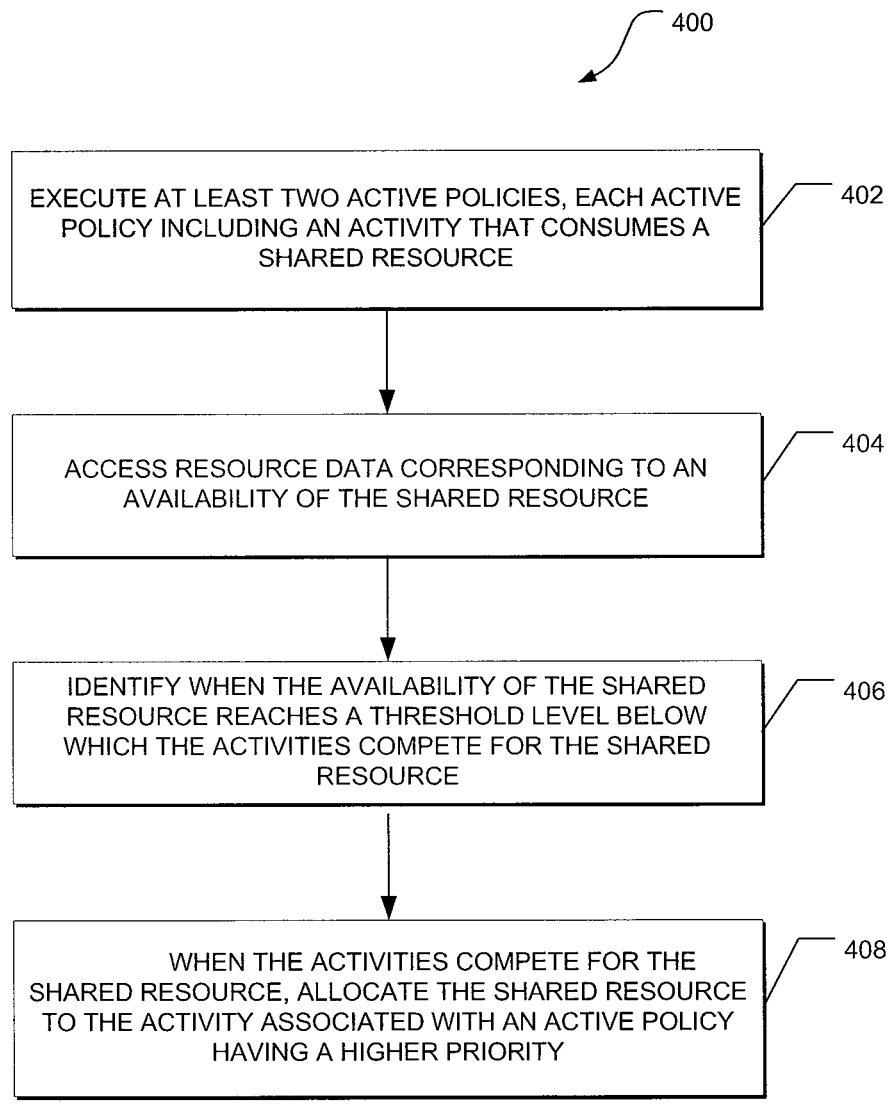
FIG. 4 depicts a flow diagram of a general overview of a method, in accordance with an example embodiment, for allocating a shared resource to entities consuming the shared resource.

FIG. 4 depicts a flow diagram of a general overview of a method 400, in accordance with an example embodiment, for allocating a shared resource to entities consuming the shared resource.

As shown at block 402, the method 400 may execute at least two active policies, each active policy including an activity that consumes a shared resource (see for example intersecting areas 212, 214, and 216 in FIG. 2). For example, the limited shared resource may be network bandwidth and the two active policies may each include activities that require the use of the available bandwidth. In an example embodiment, under normal circumstances, supply of the shared resource may not be constrained so that it is sufficient to allow completion of the activities requiring the resource. For example, under normal circumstances, the power may be supplied from a power station and, accordingly, may be in sufficient supply to allow full utilization of network bandwidth. Although network resources may still be apportioned, sufficient bandwidth may be available to allow multiple activities utilizing multiple entities to be performed. However, as described above, circumstances may arise where the shared resource is in short supply or limited (e.g., a brownout or blackout).

As shown at block 404, the method 400 includes accessing resource data corresponding to an availability of the shared resource (or shared resources). For example, the resource data may be data providing an estimation of an amount of bandwidth required to complete a particular activity (e.g., a critical back-up), data identifying an amount of electrical power required to complete an activity, or the like.

The method 400 may then identify when the availability of the shared resource reaches a threshold level below which the activities compete for the shared resource (see block 406). For example, if there is a reduction in network bandwidth, a video surveillance camera monitoring an emergency situation may compete for bandwidth with other routine communications that consume bandwidth. Thus, a high priority policy (e.g., an emergency fire detection policy), utilizing the video surveillance camera may compete for bandwidth with another non-critical or low priority policy. Thus, as shown at block 408, when the activities compete for the shared resource, the method 400 may then allocate at least a portion of the shared resource to the activity associated with an active policy having a higher priority. It should be noted that allocation (or reallocation) of the shared resource includes apportioning the shared resource between two or more devices. For example x % of the shared resource may be allocated to one device and y % of the shared resource may be allocated to another device where x and y are in the range of 0-100%. In an example embodiment, execution of an activity associated with an active policy having a lower priority is at least delayed and, optionally, terminated.

In an example embodiment, the policies and/or activities are executed serially when the shared resource reaches the threshold level so that an activity with a relatively higher priority is completed before executing an activity with a relatively lower priority. Time-sensitive activities (e.g., a backup operation when a power outage is expected and time may be of the essence) may be assigned a higher priority than activities and/or policies that are not time sensitive. In an example embodiment, execution of an activity associated with an active policy having a lower priority is terminated so that all resources may be allocated to a higher level policy.

Figure 5:
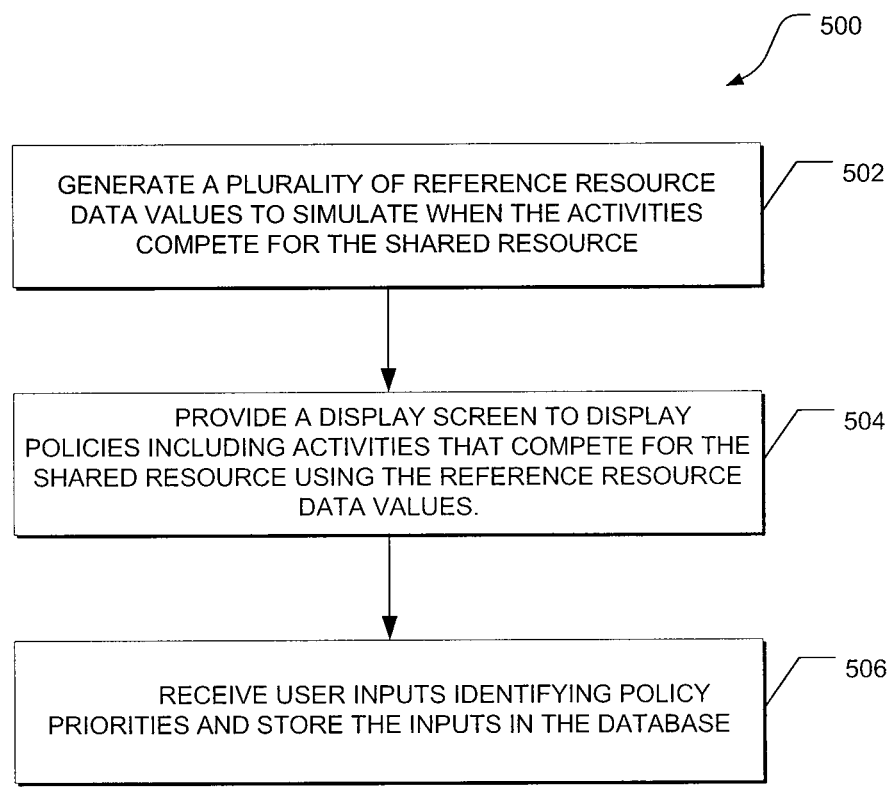
FIG. 5 depicts a flow diagram of a general overview of a method, in accordance with an example embodiment, for simulating resource consumption when executing one or more policies.

FIG. 5 depicts a flow diagram of a general overview of a method 500, in accordance with an example embodiment, for simulating resource consumption (e.g., bandwidth in a network, power required for operation of an electronic device, or the like) when executing one or more policies.

The method 500, in an example embodiment, generates a plurality of reference resource data values to simulate when the activities compete for the shared resource (see block 502). For example, reference resource data may be stored in a database and provide resource consumption details of one or more entities. For example, the resource may be electrical power and the entity may be a server arrangement that attends to backing up data. The reference resource data may then include data that provides an indication as to how much power the server arrangement requires to complete a backup operation. If, for example, an emergency power situation arises during the course of a backup operation, the resource data may be accessed to determine how much power is required to complete the backup operation. Accordingly, in use, the method 400 may then use this resource data to identify a threshold level below which other routine power consuming operations compete with the server backup arrangement and, accordingly, allocate power to a higher priority operation such as the server backup operation. In an example embodiment, power may be reallocated from lower priority operations to higher priority operations by apportioning more (e.g., increasing the percentage) of power supplied to the higher priority operations (and thus reducing the percentage of power supplied to lower priority applications). The percentage of power supplied may vary from 0% to 100% of the available power.

In an example embodiment, the method 500 may also monitor resource consumption of various entities associated with various policies 200 to obtain resource consumption data. This resource consumption data may then be stored in a database as reference resource data for subsequent use by the method 400. In one example policy when rationing of a resource occurs, resource consuming devices are required to provide the resource allocation apparatus 108 with an estimate of the power the device would require to complete the operations it is attempting to start. The resource allocation apparatus 108 (e.g., using its policy engine 310) may then evaluate the priority of the operation, the required resources, the availability of resources for all operations and other requirements for resources from competing operations. Allocation of resources may then be based on this evaluation As shown at block 504, in an example embodiment, the method 500 provides a display (e.g., using a GUI) to display policies including activities that compete for a shared resource using the plurality of resource data values. In an example embodiment, the GUI may receive user inputs (see block 506) identifying policy priorities and store the inputs in a database. For example, when a conflict is identified in which policies compete for the consumption of a shared resource, an indication may be provided to the user of such a conflict and the user may then prioritize which particular policy is a higher priority policy and, accordingly, may override a lower priority policy in consuming the resource.

Figure 6:
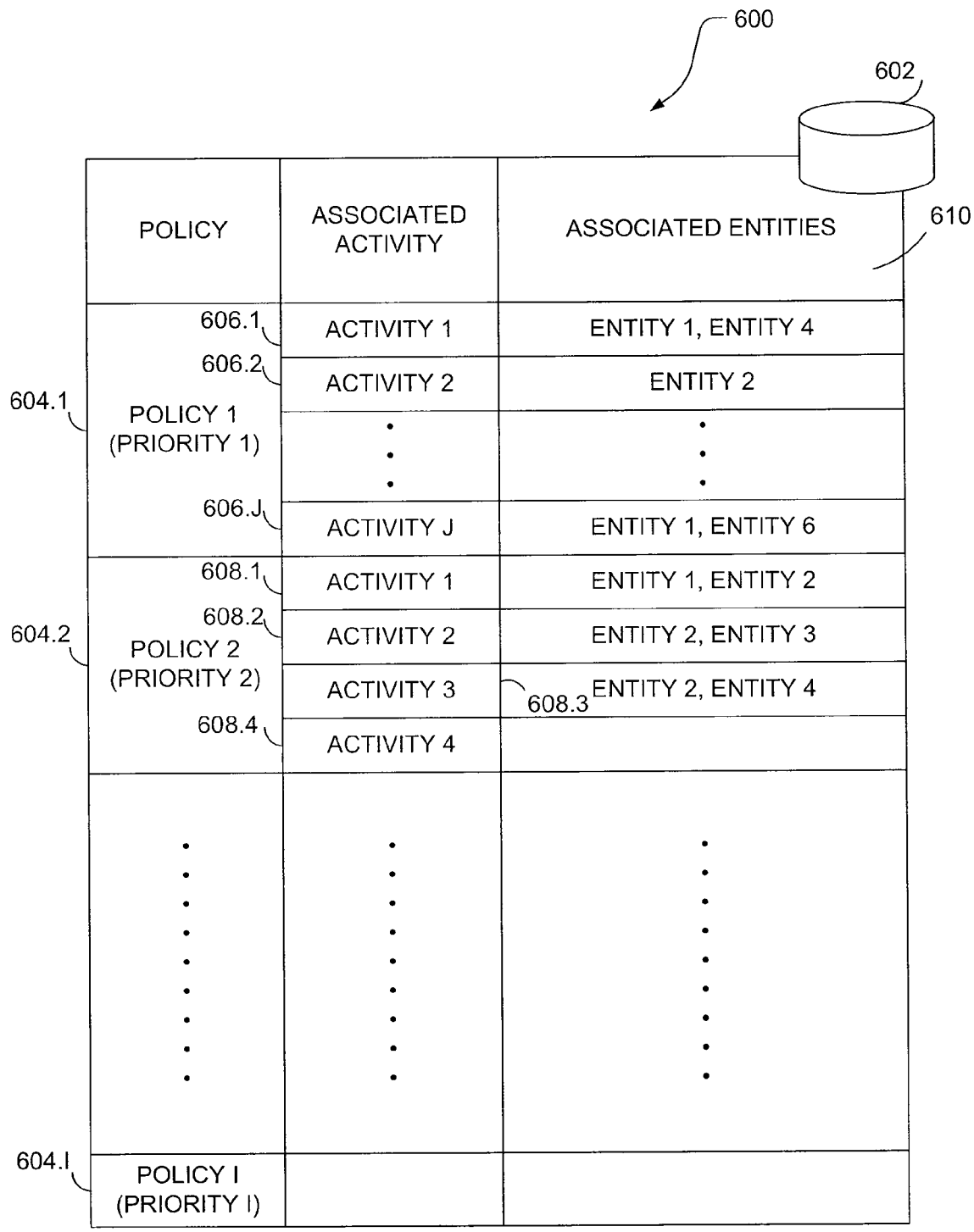
FIG. 6 depicts an example table in a database identifying activities associated with different policies and entities associated with each activity.

FIG. 6 depicts an example table 600 in a database 602 identifying activities associated with different policies and the entities associated with each activity. The table 600 is shown to include a plurality of policy fields 604.1-604.1 wherein each policy 604.1-604.1 includes one or more activities. Each activity, in turn, is associated with one or more entities. For example, in the example table 600 the policy 604.1 is shown to have associated activities 606.1-606.J, the policy 604.2 is shown to include activities 608.1-608.4. Returning to policy 604.1, the activity 606.1 is shown to be associated with entity 1 and entity 4, the activity 606.2 is shown to be associated with entity 7, and the activity 606.J is shown be associated with entity 1 and entity 6. Associated entities are stored in an associated entity column 610 in the table 600.

As can be seen in table 600 (as well as in the policies 200 shown in FIG. 2), a single entity that consumes a resource may be associated with more than one policy. Accordingly, when more than one policy associated with a particular entity is active (e.g., policy 604.1/activity 606.1 and policy 604.2/ activity 608.1), the policies may compete for a shared resource consumed by the entity. Accordingly, in an example embodiment, the policy engine 310 (see FIG. 3) may allocate a limited shared resource to a particular policy having a higher priority. Accordingly, as shown in the table 600, each policy may have an associated priority. For example, the policy 604.1 may have a priority 1, the policy 604.2 may have a priority 2, and the policy 604.1 may have a priority I. The priority 1 may be greater than the priority 2, which may be greater than priority i. It is however to be noted that various different priorities may be associated with different policies and some policies may have the same priority. Generally, policies may be ranked in order of importance so that a policy (or policies) of higher importance is (are) given consumption priority of the shared resource when the availability of the shared resource drops below a threshold level.

Figure 7:
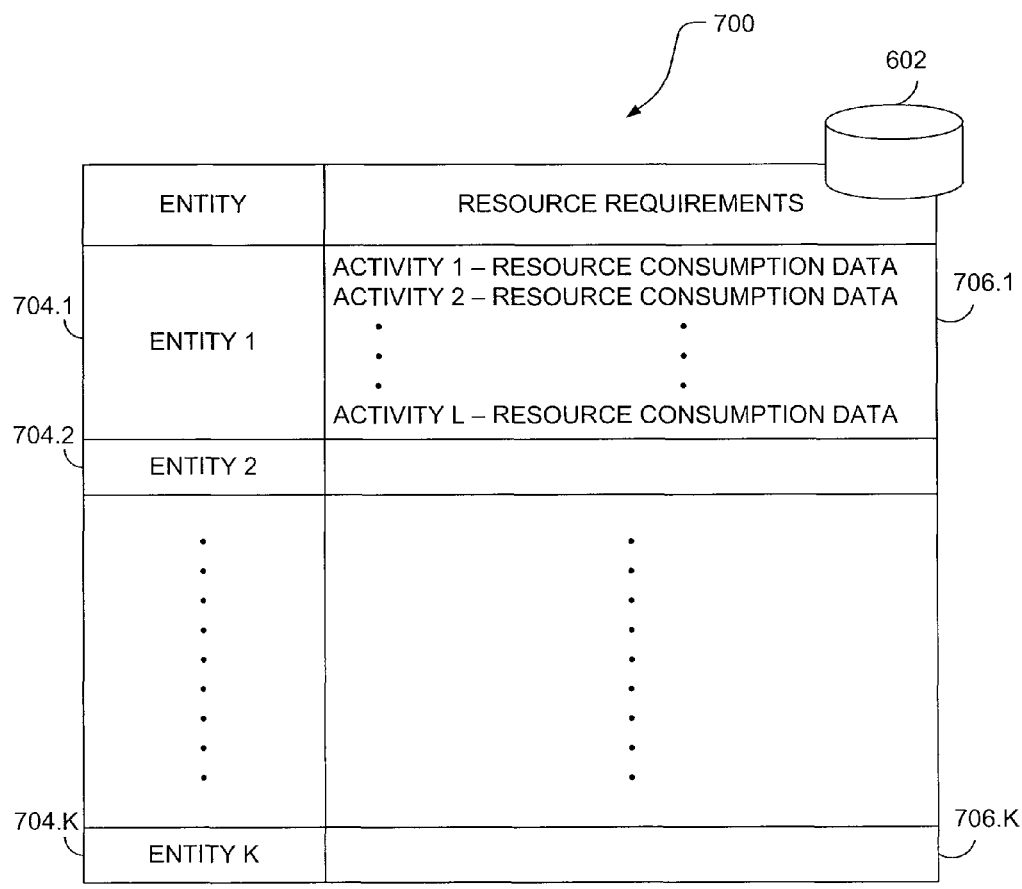
FIG. 7 depicts an example table in a database providing data on resource consumption by different entities.

FIG. 7 depicts an example table 700 in a database 602 providing reference resource data on resource consumption by different entities. The table 700 is shown to include fields for a plurality of entities 704.1-704.K as well as fields 706.1- 706.K to store reference resource consumption data associated with each activity. In addition for some activities, the table 700 may also include information about the amount of energy required to complete specific activities (e.g., a backup operation). Thus, the entity 704.1 may have a plurality of activities (e.g., activity 1-activity 1) each of which consumes a shared resource. Using the data in the table 700, the resource availability monitor 314 shown in FIG. 3 may identify when a resource reaches a threshold level below which there is an insufficient amount of the resource available for full execution of two or more policies. Accordingly, the policies now compete for a shared resource and, in an example embodiment the resource allocator 312 of the policy engine 310 may dictate which policy receives priority over the limited shared resource.

In an example embodiment, the simulation module 318 calculates and estimates whether a system has sufficient resources to successfully complete activities required by both policies before launching these activities. If the analysis indicates that the system may not have sufficient resources to complete both activities, the policy engine 318 may decide to starve one activity and provide all available resources to another activity which could successfully complete using the available resources despite the fact that this activity does not necessarily have the highest priority.

Figure 8:
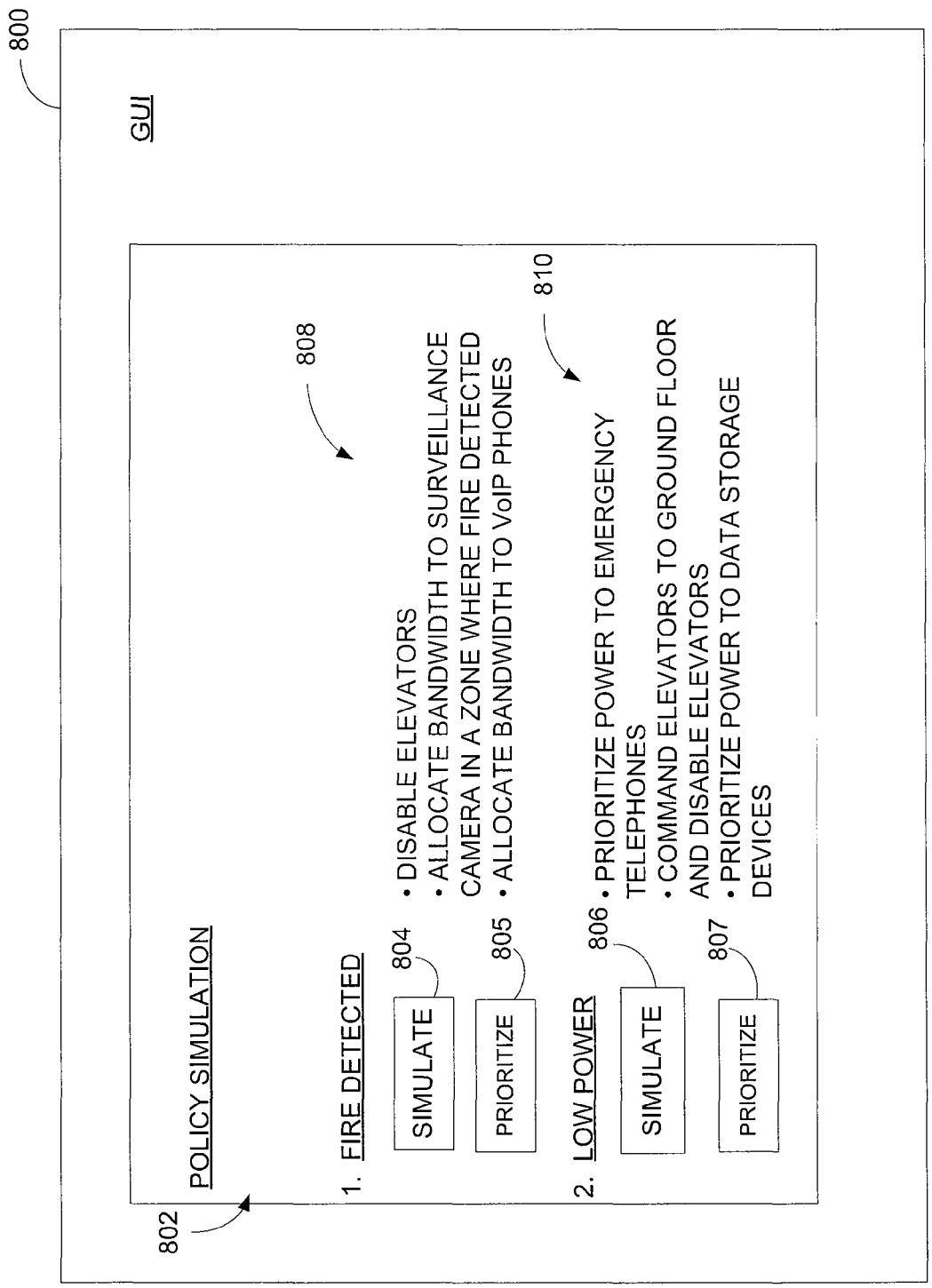
FIG. 8 depicts an example Graphical User Interface (GUI) used to simulate policies to identify conflicts in resource consumption.

FIG. 8 depicts an example GUI 800 to simulate policies to identify resource conflicts. The GUI 800 is shown to include a display area 802 that provides a user interface for a user to simulate execution of various policies. In an example embodiment the GUI 800 is generated by the GUI module 316 (see FIG. 3). In the display area 802, two example policies are shown, namely, a "FIRE DETECTED" policy and a "LOW POWER" policy. The FIRE DETECTED policy controls activities 808 that are executed when a fire is detected in a building. Activities 808 associated with the policy are shown to include disabling elevators, allocating bandwidth to a surveillance camera(s) in a zone where the fire is detected, and allocating bandwidth to VoIP phones. The LOW POWER policy includes the activities 810 of prioritizing power to emergency telephones, commanding elevators to a ground floor and then disabling the elevators, and prioritizing power to data storage devices. "SIMULATE" buttons 804, 806 allow a user (e.g., an administrator using an administrator's console) to simulate and/or analyze consumption of one or more resources (e.g., bandwidth, power remaining from a backup battery supply, or the like) when a particular policy is executed. When execution of a particular policy is simulated and/or analyze, consumption data of various entities associated with the policy may be stored in a database for subsequent use by the method 400. As shown in block 506 of the method 500, a user may prioritize a particular policy over another policy by clicking on one of the "PRIORITIZE" buttons 805, 807. Data is then stored in the database so that the selected policy enjoys priority to a limited shared resource selected by the user when the policies compete for the resource.

Figure 9:
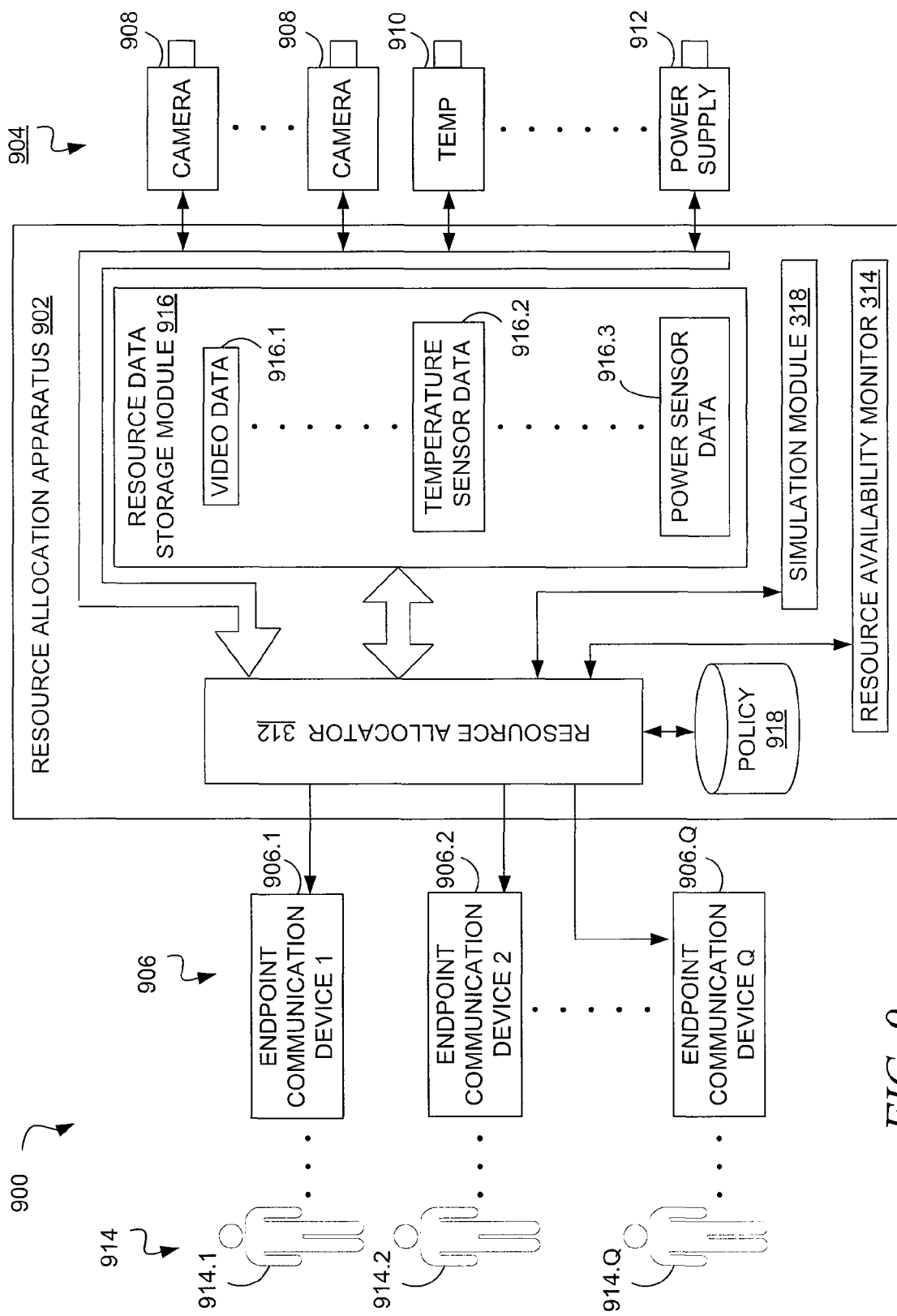
FIG. 9 depicts a simplified diagram of a further system, in accordance with an example embodiment, to allocate limited shared resources to entities via a network in an emergency situation.

FIG. 9 depicts a simplified diagram of further system 900, in accordance with an example embodiment, to allocate limited resources to entities via a network in an emergency situation.

The system 900 is shown to include a resource allocation apparatus 902 that allocates resources to entities including sensors 904 and endpoint communication devices 906. The sensors 904 are shown by way of example to include video surveillance cameras 908, temperature sensors 910, sensors in power supplies 912, or the like. Resources associated with the video surveillance cameras 908 include power and bandwidth, resources associated with the temperature sensor 910 include power, and so on. The endpoint communication devices 906 are each associated with a user 914.1-914.Q. The endpoint communication devices 906 may correspond to the mobile telephones 116, the push-to-talk radios 120, the VoIP telephones 104.1, and the telephones 112 shown in FIG. 1. For example, the users 914 may be part of an emergency response team. Likewise, the resource allocator 312 may allocate bandwidth to selected video surveillance cameras 908 under certain circumstances. For example, one or more of the video surveillance cameras 908 may be monitoring a fire and, accordingly, a fire policy may then have a higher priority than another policy with a lower priority (e.g., a routine backup operation). In accordance with yet another example embodiment, a low power policy may include a procedure to shut down power to all routers as soon as a data backup operation completes. However, when a fire policy gets activated, the fire policy may override the low power policy and maintain the supply of power to specific routers which enable data flow through a network from a specific sensor, e.g., video camera located in the proximity of the fire. In an example embodiment, in order to identify a threshold level where two or more policies compete for a limited resource, the resource allocation apparatus 902 includes a resource data storage module 916 that stores reference resource data to enable the resource allocator 312 to identify when resources should be allocated to a policy with a higher priority. Accordingly, the apparatus 902 includes a resource availability monitor 314 to monitor the availability of resources, and the resource allocator 312 may access the resource data storage module 916 to identify when the available resources are at a level below which entities compete for the shared resource. In an example embodiment, a policy database 918 stores a plurality of policies (see FIGS. 6 and 7) wherein each policy in the policy database 918 has an associated priority and identifies activities and entities associated with the policy. The resource data module 916 may include video data 916.1, temperature sensor data 916.2, and power sensor data 916.3 to name but a few.

Figure 10:
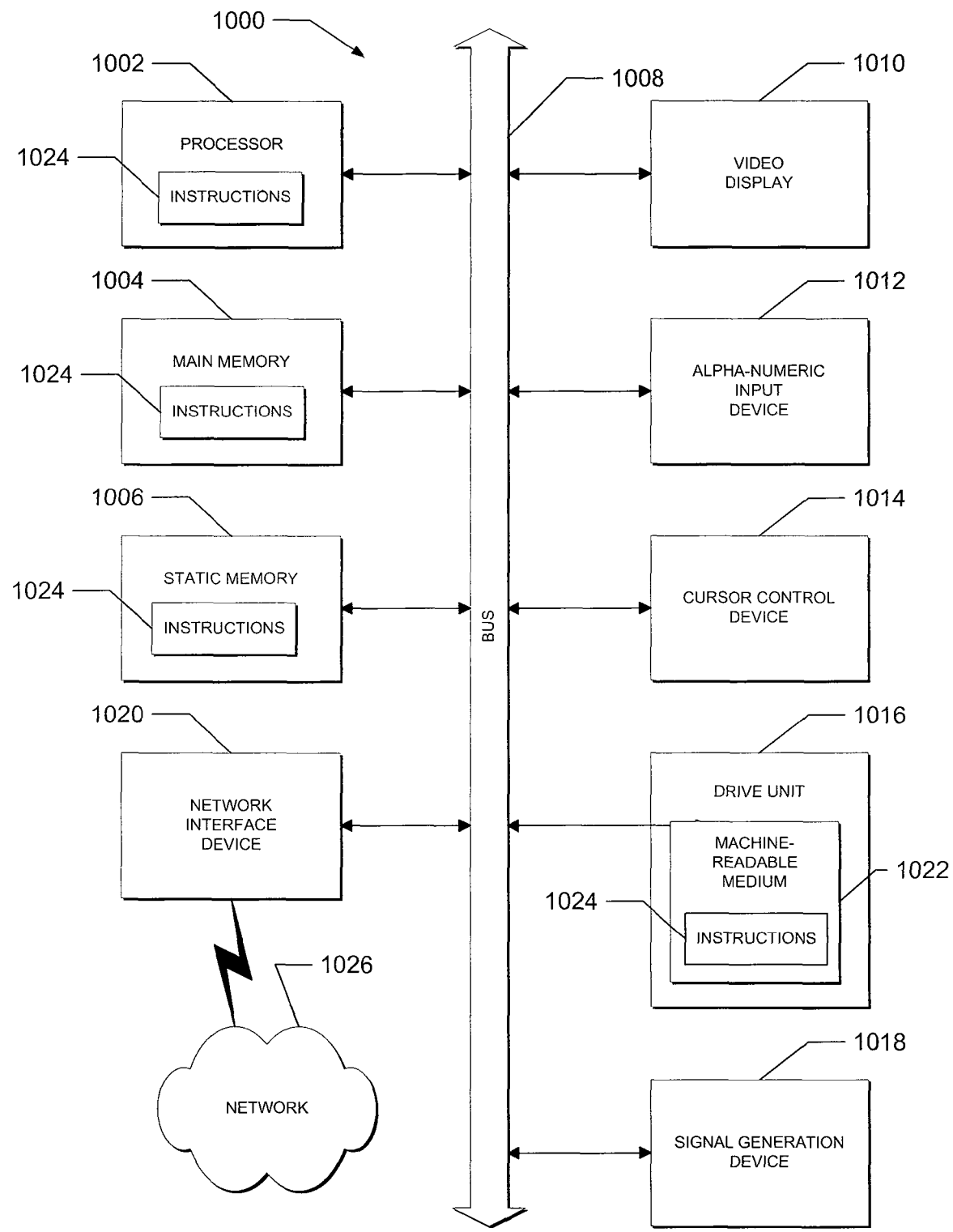
FIG. 10 is a simplified block diagram of a machine in the example form of a computing system within which a set of instructions, for causing the machine to perform any one or more of the methodologies discussed herein, may be executed.

FIG. 10 is a simplified block diagram of a machine in the example form of a computing system within which a set of instructions, for causing the machine to perform any one or more of the methodologies discussed herein, may be executed.

In alternative embodiments, the machine may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 1000 includes one or more processors 1002 (e.g., a central processing unit (CPU), a graphics processing unit (GPU) or both), main memory 1004 and static memory 1006, which communicate with each other via bus 1008. The computing system 1000 may further include video display unit 1010 (e.g., a plasma display, a liquid crystal display (LCD) or a cathode ray tube (CRT)). The computing system 1000 also includes an alphanumeric input device 1012 (e.g., a keyboard), a user interface (UI) navigation device 1014 (e.g., a mouse), disk drive unit 1016, a signal generation device 1018 (e.g., a speaker) and a network interface device 1020.

The disk drive unit 1016 includes a machine-readable medium 1022 on which is stored one or more sets of instructions and data structures (e.g., software 1024) embodying or utilized by any one or more of the methodologies or functions described herein. The software 1024 may also reside, completely or at least partially, within main memory 1004 and/or within the processor 1002 during execution thereof by the computing system 1000, with main memory 1004 and processor 1002 also constituting machine-readable, tangible media. The software 1024 may further be transmitted or received over a network 1026 via a network interface device 1020 utilizing any one of a number of well-known transfer protocols (e.g., Hypertext Transfer Protocol (HTTP)).

While the machine-readable medium 1022 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, and solid-state memories, optical and magnetic media.

While the invention(s) is (are) described with reference to various implementations and exploitations, it will be understood that these embodiments are illustrative and that the scope of the invention(s) is not limited to them. In general, techniques for embedding priorities in multimedia streams may be implemented with facilities consistent with any hardware system(s) defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A computerized method comprising:
executing at least two active policies using one or more processors, each active policy including an activity that consumes electrical power from a shared resource for electrical power, and each active policy being associated with a corresponding priority for allocations of the shared resource;
accessing a database to obtain reference resource data corresponding to an availability of the shared resource;
determining a threshold level for electrical power below which the activities compete for the shared resource by using reference resource data from the database to estimate power consumption values corresponding to the active policies for the shared resource and to identify a conflict in which the active policies compete for the shared resource;
adjusting a priority of at least one active policy relative to another active policy in response to the identified conflict, at least one power-consuming entity performing operations corresponding to active policies with different priorities;
identifying when the availability of the shared resource reaches the threshold level for electrical power below which the activities compete for the shared resource; and
when the activities compete for the shared resource, allocating at least a portion of the shared resource to the activity associated with an active policy having a higher priority, the at least one power-consuming entity being allocated power for performing operations in correspondence to the different priorities of the corresponding active policies.

2. The method of claim 1, further comprising:
generating a plurality of reference resource data values for the shared resource;
using the reference resource data values to simulate when the activities compete for the shared resource by estimating power consumption as a function of time;
using a display screen to display policies including activities that compete for the shared resource from the reference resource data values, the displayed policies including a first displayed policy and a second displayed policy, and values for the displayed policies including estimated power consumption values for the shared resource; and
receiving an input that changes a priority of the first displayed policy relative to the second displayed policy.

3. The method of claim 1, further comprising:
accessing reference power consumption data that identifies a completion level of the shared resource required to complete execution of the activity associated with the active policy having the higher priority; and
setting the threshold level to at least the completion level.

4. The method of claim 3, further comprising:
identifying when the activities compete for the shared resource; and
using a display screen to display an identification of when the activities compete for the shared resource with an identification of policies corresponding to the activities competing for the shared resource, the identification of policies including a first identified policy and a second identified policy; and
receiving an input that changes a priority of the first identified policy relative to the second identified policy.

5. The method of claim 3, further comprising:
simulating activities associated with the plurality of policies over a period of time that includes a complete execution of the activity associated with the active policy having the higher priority;
monitoring power consumption during simulation of the activities to obtain power consumption data for the activity associated with the active policy having the higher priority; and
storing the power consumption data to identify the threshold level that corresponds to the complete execution of the activity associated with the active policy having the higher priority.

6. The method of claim 1, further comprising executing the activities serially when the shared resource reaches the threshold level so that an activity with a relatively higher priority is completed before executing an activity with a relatively lower priority.

7. The method of claim 1, wherein the activity is a time-sensitive activity, the method comprising assigning the higher priority to the time-sensitive activity so that the time-sensitive activity is completed before executing an activity with a relatively lower priority.

8. The method of claim 1, further comprising at least delaying execution of an activity associated with an active policy having a lower priority so that an activity with a higher priority is completed before executing the activity associated with the active policy having the lower priority.

9. The method of claim 1, further comprising:
communicating with a plurality of devices associated with the at least two active policies to determine a power required by each device for operation to complete activities associated with each active policy; and
storing the power required by each device in the database to provide the reference resource data.

10. The method of claim 1, further comprising:
identifying an availability of shared remaining resources for electrical power;
accessing reference resource data values associated with the plurality of policies;
identifying from the reference resource data when there are insufficient shared remaining resources to complete execution of a high priority activity;
when there are insufficient remaining resources, terminating the execution of the high priority activity; and
allocating at least a portion of the remaining resources previously allocated to the high priority activity to a lower priority activity.

11. The method of claim 1, wherein the at least one power-consuming entity includes a first power-consuming entity that performs operations corresponding to an active policy with an adjusted priority and an active policy with an unadjusted priority.

12. An apparatus comprising:
one or more processors; and
memory to store instructions that, when executed by the processor, cause the processor to perform the operations of:
executing at least two active policies, each active policy including an activity that consumes electrical power from a shared resource for electrical power, and each active policy being associated with a corresponding priority for allocations of the shared resource;
accessing sensor data corresponding to an availability of the shared resource;
determining a threshold level for electrical power below which the activities compete for the shared resource by using reference resource data from a database to estimate power consumption values corresponding to the active policies for the shared resource and to identify a conflict in which the active policies compete for the shared resource;
adjusting a priority of at least one active policy relative to another active policy in response to the identified conflict, at least one power-consuming entity performing operations corresponding to active policies with different priorities;
identifying when the availability of the shared resource reaches the threshold level for electrical power below which the activities compete for the shared resource; and
when the activities compete for the shared resource, allocating at least a portion of the shared resource to the activity associated with an active policy having a higher priority, the at least one power-consuming entity being allocated power for performing operations in correspondence to the different priorities of the corresponding active policies.

13. The apparatus of claim 12, further comprising the operations of:
generating a plurality of reference resource data values for the shared resource;
using the reference resource data values to simulate when the activities compete for the shared resource by estimating power consumption as a function of time;
using a display screen to display policies including activities that compete for the shared resource from the reference resource data values, the displayed policies including a first displayed policy and a second displayed policy, and values for the displayed policies including estimated power consumption values for the shared resource; and
receiving an input that changes a priority of the first displayed policy relative to the second displayed policy.

14. The apparatus of claim 12, further comprising the operations of:
accessing reference power consumption data that identifies a completion level of the shared resource required to complete execution of the activity associated with the active policy having the higher priority; and
setting the threshold level to at least the completion level.

15. The apparatus of claim 14, further comprising the operations of:
identifying when the activities compete for the shared resource;
using a display screen to display an identification of when the activities compete for the shared resource with an identification of policies corresponding to the activities competing for the shared resource, the identification of policies including a first identified policy and a second identified policy; and
receiving an input that changes a priority of the first identified policy relative to the second identified policy.

16. The apparatus of claim 14, further comprising the operations of:
executing activities associated with the plurality of policies over a period of time that includes a complete execution of the activity associated with the active policy having the higher priority;
monitoring power consumption during execution of the activities to obtain power consumption data for the activity associated with the active policy having the higher priority; and
storing the power consumption data to identify the threshold level that corresponds to the complete execution of the activity associated with the active policy having the higher priority.

17. The apparatus of claim 12, further comprising the operations of executing the activities serially when the shared resource reaches the threshold level so that an activity with a relatively higher priority is completed before executing an activity with a relatively lower priority.

18. The apparatus of claim 12, wherein the activity is a time-sensitive activity, and the apparatus further comprises the operations of assigning the higher priority to the time-sensitive activity so that the time-sensitive activity is completed before executing an activity with a relatively lower priority.

19. The apparatus of claim 12, wherein execution of an activity associated with an active policy having a lower priority is terminated when the policies compete for the shared resource so that an activity with a higher priority is completed before executing the activity associated with the active policy having the lower priority.

20. A non-transitory machine-readable medium that stores a set of instructions that, when executed by a machine, cause the machine to perform operations comprising:

executing at least two active policies using one or more processors, each active policy including an activity that consumes electrical power from a shared resource for electrical power, and each active policy being associated with a corresponding priority for allocations of the shared resource;

accessing a database to obtain reference resource data corresponding to an availability of the shared resource;

determining a threshold level for electrical power below which the activities compete for the shared resource by using reference resource data from the database to estimate power consumption values corresponding to the active policies for the shared resource and to identify a conflict in which the active policies compete for the shared resource;

adjusting a priority of at least one active policy relative to another active policy in response to the identified conflict, at least one power-consuming entity performing operations corresponding to active policies with different priorities;

identifying when the availability of the shared resource reaches the threshold level for electrical power below which the activities compete for the shared resource; and when the activities compete for the shared resource, allocating at least a portion of the shared resource to the activity associated with an active policy having a higher priority, the at least one power-consuming entity being allocated power for performing operations in correspondence to the different priorities of the corresponding active policies.

21. The non-transitory machine-readable medium of claim 20, wherein the instructions further cause the machine to perform operations comprising:

generating a plurality of reference resource data values for the shared resource;

using the reference resource data values to simulate when the activities compete for the shared resource by estimating power consumption as a function of time;

using a display screen to display policies including activities that compete for the shared resource from the reference resource data values, the displayed policies including a first displayed policy and a second displayed policy, and values for the displayed policies including estimated power consumption values for the shared resource; and receiving an input that changes a priority of the first displayed policy relative to the second displayed policy.

22. The non-transitory machine-readable medium of claim 20, wherein the instructions further cause the machine to perform operations comprising:

accessing reference power consumption data that identifies a completion level of the shared resource required to complete execution of the activity associated with the active policy having the higher priority; and setting the threshold level to at least the completion level.

\* \* \* \* \*